United States Patent [19]

DiGiovanni et al.

[11] Patent Number: 5,633,964
[45] Date of Patent: May 27, 1997

[54] ARTICLE COMPRISING A MULTI-STAGE ERBIUM-DOPED FIBER AMPLIFIER

[75] Inventors: David J. DiGiovanni, Montclair; Gloria R. Jacobovitz-Veselka, Morganville; Paul F. Wysocki, Scotch Plains, all of N.J.

[73] Assignee: Lucent Technologies Inc., Murray Hill, N.J.

[21] Appl. No.: 601,928

[22] Filed: Feb. 15, 1996

[51] Int. Cl.$^6$ .................................................. G02B 6/26
[52] U.S. Cl. .................................. 385/27; 385/24; 372/6
[58] Field of Search ................................... 372/6, 19, 20, 372/21, 22, 102; 385/24, 27, 141, 142, 144

[56] References Cited

U.S. PATENT DOCUMENTS 5,058,976 10/1991 DiGiovanni et al. .................. 359/173
5,311,525 5/1994 Pantell et al. ............................ 372/6

OTHER PUBLICATIONS

J. M. P. Delavaux et al. "Multi-Stage Erbium-Doped Fiber amplifier Designs", *J. of Lightwave Technology*, vol. 13, No. 5, pp. 703-720 (1995).

B. Pedersen, et al., "Experimental and Theoretical Analysis of Efficient Erbium-Doped Fiber Power Amplifiers", *IEEE Transactions Photonics Technology Letters*, vol. 3, No. 12, pp. 1085-1087, (1991).

T. Kashiwada, et al. "Erbium-Doped Fiber Amplifier Pumped at 1.48 µm with Extremely High Efficiency", *IEEE Photonics, Technology Letters*, vol. 3, No. 8, pp. 721-723, (1991).

R. S. Quimby et al., "Unconversion and 980-nm excited-state absorption in erbium-doped glass", *Technical Abstracts, SPIE's International Symposium OE/Fibers*, Paper 1789-06, (1992).

J. C. Livas et al., "A One-Watt, 10-Gbps High-Sensitivity Optical Communication System", *IEEE Photonics Technology Letters*, vol. 7, No. 5, (1995).

C. R. Giles et al., "Modeling Erbium-Doped Fiber Amplifiers", *Journal of Lightwave Technology*, vol. 9, No. 2, pp. 271-283, (1991).

*Primary Examiner*—John Ngo
*Attorney, Agent, or Firm*—Eugen E. Pacher

[57] ABSTRACT

Multistage Er-doped fiber amplifiers (EDFAs) advantageously use high numerical aperture (NA) fiber in the input stage, and low NA fiber in the output stage. The former typically is greater than 0.25, and the latter is less than 0.20. Such amplifiers can have high gain and low noise figure.

7 Claims, 2 Drawing Sheets

ARTICLE COMPRISING A MULTI-STAGE ERBIUM-DOPED FIBER AMPLIFIER

FIELD OF THE INVENTION

This invention pertains to multi-stage Er-doped fiber amplifiers (EDFAs), and to articles and systems (collectively "articles") that comprise such EDFAs.

BACKGROUND OF THE INVENTION

EDFAs, including multi-stage EDFAs, are known, and are expected to find wide commercial use in optical fiber communication systems. EDFAs can be used as power amplifiers, as pre-amplifiers, or as in-line amplifiers in long (e.g., >100 km) transmission lines. See, for instance, J. M. Delavaux et al., *J. Lightwave Technology*, Vol. 13(5), p. 703. Although a variety of pump wavelengths have been used, current interest is almost exclusively in EDFAs pumped at about 980 nm or 1480 nm, for signal wavelengths of about 1.55 µm.

Desirable properties of amplifiers are low noise and/or good power conversion efficiency. With regard to EDFAs, it has been recognized that use of high numerical aperture (NA) Er-doped amplifier fiber can improve noise figure, gain and power conversion efficiency. See, for instance, B. Pedersen et al., *IEEE Photonics Technology Letters*, Vol. 3(12), p. 1085, and T. Kashiwada et al., *IEEE Photonics Technology Letters*, Vol. 3(3), p. 721. However, recently it was discovered that low NA amplifier fiber can yield high power conversion efficiency when pumping with high power (>500 mW) 980 nm pump radiation. See, for instance, J. C. Livas et al., *Proceedings of CLEO*, CPD 27-1, May 21–26, 1995, Baltimore, Md.

"NA" herein has the conventional meaning, namely, NA= $\sqrt{2n\Delta n}$, where n is the core refractive index, and $\Delta n = n - n_{c1}$, the un-normalized difference between the core refractive index and $n_{c1}$, the refractive index of the inner cladding.

In view of the anticipated wide use of EDFAs in optical fiber communication systems, it would be highly desirable to have available EDFAs that can provide both high power conversion efficiency and low noise figure. This application discloses a multistage EDFA that can provide these advantageous features.

SUMMARY OF THE INVENTION

In a broad aspect the invention is embodied in an article (e.g., an EDFA, or an optical fiber communication system that comprises an EDFA) that comprises an improved multistage EDFA.

More specifically, the multistage EDFA has an input port, an output port, and a transmission path connecting the input and output ports. The transmission path comprises optical fiber, but may also comprise components (e.g., a magneto-optic optical isolator) that involve at least some unguided propagation of signal radiation. The signal radiation wavelength will typically be about 1.55 µm. The transmission path comprises a first length of Er-doped optical fiber in an input amplifier stage, and a second length of Er-doped optical fiber in an output amplifier stage. As is conventional, the "input amplifier stage" is the first amplifier stage after the input port, and the "output amplifier stage" is the last amplifier stage before the output port. The multistage fiber amplifier typically also comprises means (exemplarily comprising a wavelength-selective optical fiber coupler or "WDM") for coupling pump radiation (exemplarily but not necessarily of wavelength at or near 980 nm) into the amplifier fibers.

Significantly, the first length of Er-doped optical fiber is selected to have numerical aperture of value $NA_1$, and the second length of Er-doped optical fiber is selected to have numerical aperture of value $NA_2$, with $NA_1 > NA_2$, and $(NA_1 - NA_2)/NA_1 > 0.1$. For smaller differences between $NA_1$ and $NA_2$ the technical advantage becomes too small to be of significance. Exemplarily, $NA_1 > 0.25$, and $NA_2 < 0.2$.

As will be discussed in detail below, choice of high NA fiber for the input amplifier stage and low NA fiber for the output stage can result in a low noise multistage EDFA that has high power conversion efficiency, at least for high pump power.

The amplifier according to the invention can be embodied in a variety of designs. For instance, the amplifier can have more than two amplifier stages, and/or can be pumped in any appropriate fashion, including co-propagating, counter-propagating or dual-pumping on each, some or all stages, and at all appropriate pump wavelengths, not necessarily limited to wavelengths at or near 980 nm (e.g., in the range 950–1000 nm). It can also have clearly separated amplifier stages, with one or more passive components (e.g., filter, isolator, WDM) between the stages, or can have amplifier stages that are directly joined together (e.g., by means of a fusion splice between the first and second lengths of amplifier fiber, such that the amplifier fiber is substantially continuous, the two stages identifiable only in terms of NA and, possibly, of one or more other fiber properties such as $\Delta n$, core diameter, or Er-doping). Furthermore, the amplifier can be incorporated into a fiber communication system in any known manner, e.g., with or without isolators before and/or after the amplifier, and can be operated at any power level within the design range of the amplifier. Amplifier fibers for use in EDFAs according to the invention can be conventional Er-doped optical fibers.

DETAILED DESCRIPTION OF EXEMPLARY EMBODIMENTS

Figure 1:
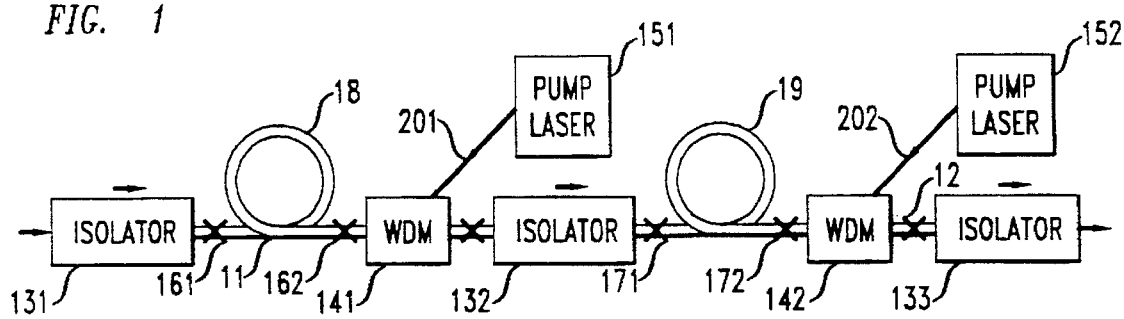
FIG. 1 schematically shows an exemplary 2-stage EDFA according to the invention.

FIG. 1 schematically depicts an exemplary 2-stage EDFA according to the invention, wherein numerals 11 and 12 refer, respectively, to signal input port and output port, with 12 being "downstream" of 11. Components 131–133 are optical isolators, 141–142 are WDMs, 151–152 are pump lasers, and the "X" designate fiber connections, typically fusion splices. Optical isolators, WDMs and pump lasers suitable for pumping EDFAs are known and are commercially available. Those skilled in the art know that it is conventional but optional to place optical isolators respectively upstream and downstream of an EDFA. Similar, it is conventional but optional to place an optical isolator between the two stages of a 2-stage EDFA. Numerals 201 and 202 designate pump radiation input ports.

Numerals 18 and 19 refer respectively to the first and second amplifier fibers, exemplarily extending between splices 161 and 162, and 171 and 172, respectively. Significantly, the first and second amplifier fibers differ at least with regard to their NA, with 18 having relatively high NA designated $NA_1$, and 19 having relatively low NA designated $NA_2$. Exemplarily, $NA_1 > 0.25$, and $NA_2 < 0.2$. In any case, $(NA_1 - NA_2)/NA_1 > 0.1$.

We have discovered that choice of amplifier fibers as described can result in multi-stage EDFAs having good power conversion efficiency and low noise. We currently believe that these advantageous characteristics of multi-stage EDFAs according to the invention are related to the occurrence of pump excited-state absorption (ESA) from the pump state, an effect which increases as the square of the pump radiation intensity in the Er-doped amplifier fiber. Since for given pump power, pump radiation intensity is lower in a low NA fiber than in a high NA fiber, a low NA fiber is less subject to ESA from the pump state than a high NA fiber. Consequently, a low NA fiber can exhibit good power conversion efficiency even at high pump power.

In order to attain a low noise figure, high pump radiation intensity is required, to invert as many Er ions as possible. Hence, high NA fiber can produce lower noise figures. In view of the fact that the noise figure of a multi-stage EDFA typically is determined almost totally by the noise figure of the first (input) stage, it is advantageous if the first stage amplifier fiber has relatively high NA, and the last (output) stage amplifier fiber has relatively low NA.

The above remarks are provided for tutorial reasons only, and the validity or scope of the claims in no way depend on the correctness of the above remarks.

R. S. Quimby et at., *Technical Abstracts, SPIE's International Symposium OE/Fibers*, Boston, September 1992, Paper 1789–06, Session 2, attribute the quadratic increase of green fluorescence from Er-doped fiber with pump power to the existence of pairs or clusters of strongly interacting Er-ions, and state that pump ESA from the pump state is a potential limitation on EDFA efficiency.

J. C. Livas et at., *Proceedings of CLEO*, Baltimore, May 21–26, 1995, reported a 3-stage high power EDFA, disclosed that the dominant source of non-ideal behavior is pump excited state absorption, and also disclosed that their work demonstrates that several watts of power at 1.5 μm can be efficiently obtained with 80 nm semiconductor pump lasers and conventional single mode, single clad fiber. No fiber details were reported.

Figure 2:
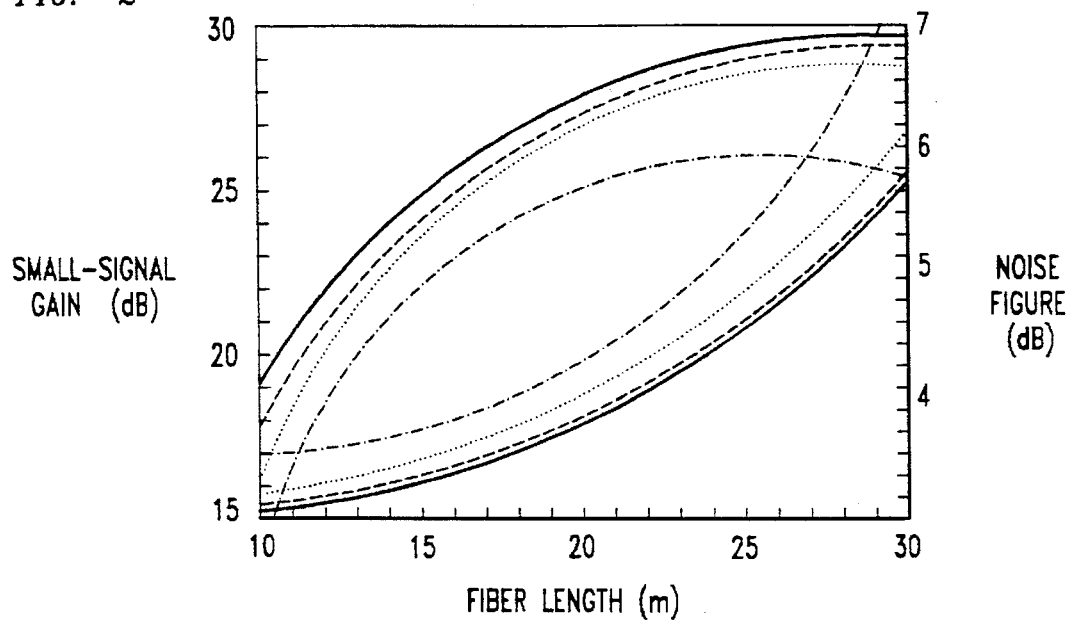
FIG. 2 shows exemplary computed data on gain and noise figure as a function of fiber length and fiber NA.

FIG. 2 shows exemplary computed data on small signal gain and noise figure for Er-doped fibers of NA=0.17, 0.23, 0.29 and 0.35, respectively, for constant signal power and pump power (The data were obtained by numerical simulation, using commercially available computer model OASIX(™) that is based on the work of C. R. Giles et al., *IEEE J. of Lightwave Technology*, Vol. 9(2), p. 71. As can be readily seen, NA=0.35 provides highest gain and lowest noise figure.

Figure 3:
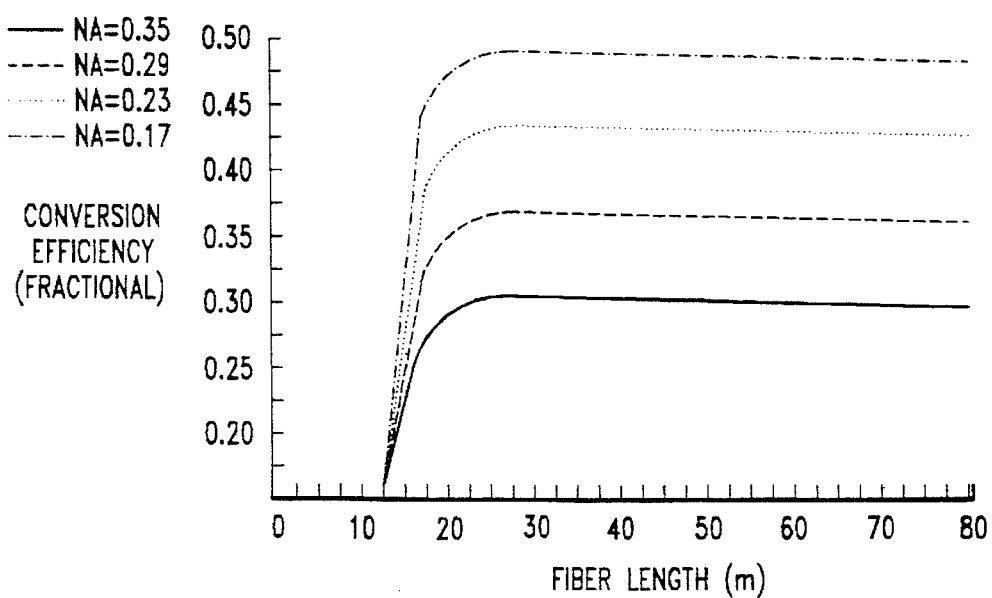
FIG. 3 shows exemplary computed data on power conversion efficiency as a function of fiber length and NA.

FIG. 3 shows exemplary computed data of power conversion efficiency for Er-doped fiber of NA=0.17, 0.23, 0.29 and 0.35, respectively, 5 mW signal power (1550 nm) and 500 mW pump power (at 980 nm). NA=0.17 clearly provides the highest power conversion efficiency.

Figure 4:
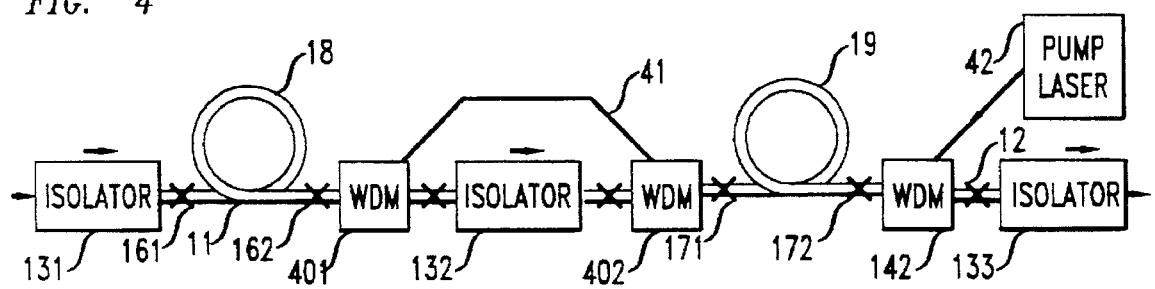
FIG. 4 schematically shows a further exemplary 2-stage EDFA according to the invention.

FIG. 4 schematically shows an alternative exemplary embodiment of the invention, wherein WDMs 401 and 402 and fiber 41 are provided to enable radiation from pump laser 42 to by-pass inter-stage isolator 132, such that a single pump source can pump both amplifier stages. As in all embodiments of the invention, the first amplifier fiber (18) has NA larger than that of the second amplifier fiber (19).

Figure 5:
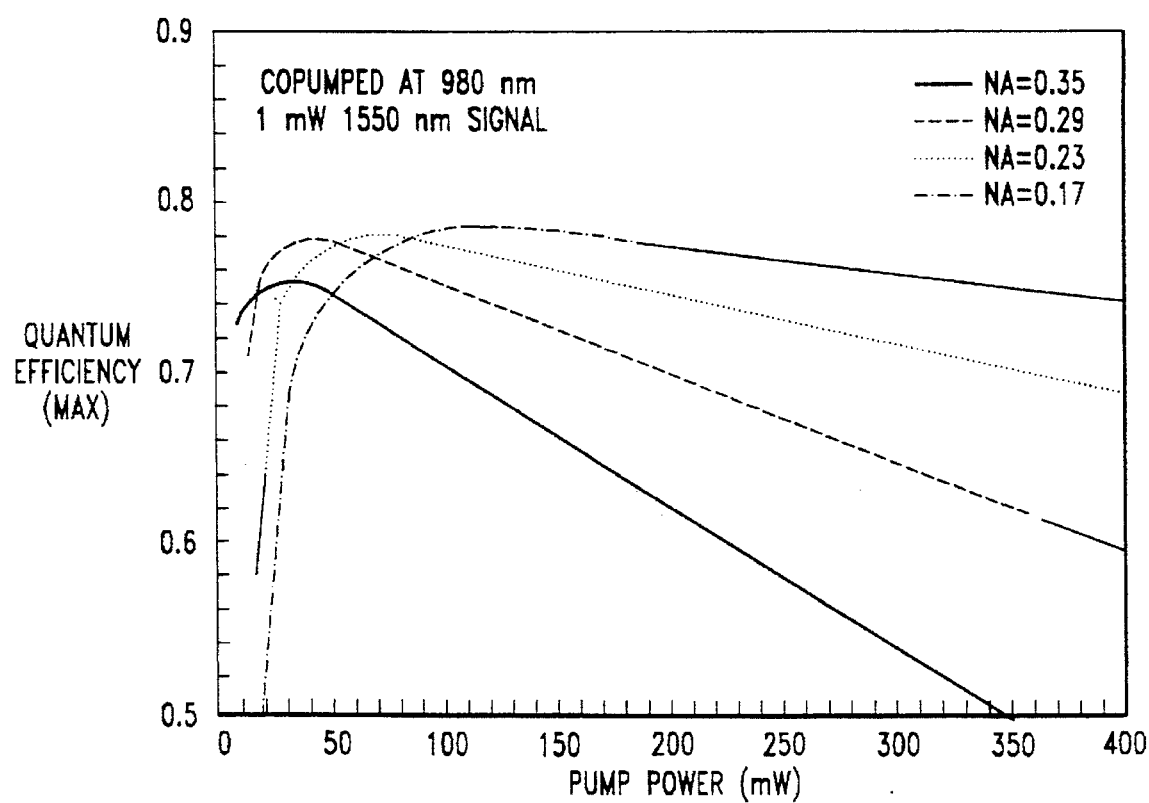
FIG. 5 shows exemplary computed data on quantum efficiency vs. pump power.

FIG. 5 shows computed data on quantum efficiency vs. pump power, for different values of NA, for conventional Er-doped fiber co-pumped at 980 nm, with 1 mW 1550 nm signal.

Figure 6:
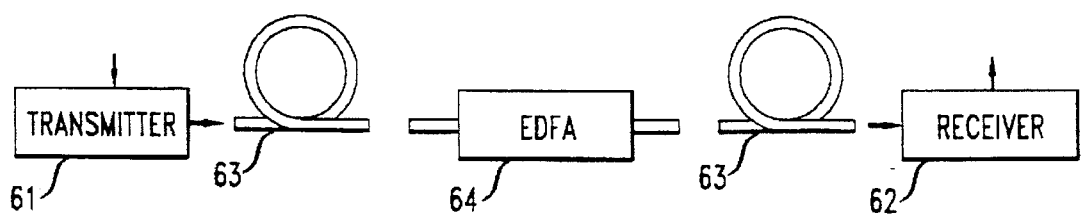
FIG. 6 schematically shows an exemplary optical fiber communication system according to the invention.

FIG. 6 schematically shows an exemplary optical fiber communication system 60 according to the invention, wherein numerals 61–64 refer, respectively, to the transmitter, receiver, optical fiber and multistage EDFA according to the invention.

EXAMPLE

Table 1 shows the characteristics of two Er-doped fibers that were used in numerical simulations (using the above-mentioned OASIX(™) program) that provided the results shown in Table 2. The two fibers were operationally very similar, except for the difference in NA.

TABLE 1

| Fiber Name | NA | Loss (1530 nm) | Erbium Confinement | Approx. Erbium Conc. in Mole % | Cutoff Wavelength |
|---|---|---|---|---|---|
| E002 | 0.29 | 2.659 dB/m | 80% Core | 133 | 850 nm |
| E013-2 | 0.17 | 2.653 dB/m | 100% Core | 150 | 825 nm |

The results of Table 2 assume a 2-stage amplifier with isolator between the stages. It was assumed that the first and second stages are counter-pumped with, respectively, 50 mW and 500 mW, at 980 nm, that the signal input is 0.1 mW at 1550 nm, that interstage isolation is 40 dB and interstage loss is 2 dB, and that post-amplifier loss is 0.5 dB.

TABLE 2

| Stage 1 EDF | Stage 1 Length (m) | Stage 2 EDF | Stage 2 Length (m) | Noise Figure (dB) | Power Output (dBm) |
|---|---|---|---|---|---|
| E002 | 24 | E013-2 | 34 | 4.202 | 23.31 |
| E002 | 24 | E002 | 34 | 4.204 | 22.45 |
| E013-2 | 24 | E002 | 34 | 4.496 | 22.42 |
| E013-2 | 24 | E013-2 | 34 | 4.490 | 23.27 |

The results of Table 2 show that the combination according to the invention (input stage high NA fiber E002, output stage low NA fiber E013-2) gives the lowest noise figure (4.202 dB) and highest output power (23.31 dBm). The amplifier according to the invention for instance gives 0.86 dB higher output power than the (high NA/high NA) combination of line 2 of Table 2, and 0.29 dB lower noise figure than the (low NA/low NA) combination of line 4 of Table 2.

The invention claimed is:

1. An article comprising a multistage optical fiber amplifier having an input port and an output port, with a signal transmission path connecting said input and output ports; said signal transmission path comprises a first length of Er-doped optical fiber in an input amplifier stage, and a second length of Er-doped optical fiber in an output amplifier stage; and the multistage optical fiber amplifier further comprises means for coupling a pump radiation into said signal transmission path;

CHARACTERIZED IN THAT the first length of Er-doped optical fiber is selected to have a numerical aperture of value $NA_1$, and the second length of Er-doped optical fiber is selected to have a numerical aperture of value $NA_2$, where $NA_1$ is greater than $NA_2$, with $(NA_1-NA_2)/NA_1>0.1$.

2. Article according to claim 1, wherein $NA_1>0.25$ and $NA_2<0.2$, and the multistage optical fiber amplifier is a 2-stage optical fiber amplifier.

3. Article according to claim 1, further comprising an optical isolator disposed between said first and second amplifier stages.

4. Article according to claim 3, wherein said means for coupling the pump radiation into the signal transmission path are adapted for pump radiation of approximate wavelength 980 nm, and are adapted for causing the pump radiation to propagate in the signal transmission path in the direction from the output port towards the input port.

5. Article according to claim 4, comprising a multiplicity of said means for coupling pump radiation into the signal transmission path.

6. Article according to claim 4, further comprising optical fiber for enabling pump radiation to by-pass said optical isolator.

7. Article according to claim 1, wherein the article is an optical fiber communication system comprising a transmitter, a receiver spaced apart from the amplifier, and an optical fiber transmission path that signal-transmissively connects said transmitter and said receiver, said optical fiber transmission path comprising said multistage optical fiber amplifier.

* * * * *